United States Patent
Ren et al.

(10) Patent No.: US 12,197,290 B2
(45) Date of Patent: Jan. 14, 2025

(54) LOCKSTEP PROCESSOR RECOVERY FOR VEHICLE APPLICATIONS

(71) Applicant: HUAWEI TECHNOLOGIES CO., LTD., Shenzhen (CN)

(72) Inventors: Da Qi Ren, Saratoga, CA (US); Liang Peng, Los Gatos, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/071,459

(22) Filed: Nov. 29, 2022

(65) Prior Publication Data

US 2023/0092343 A1 Mar. 23, 2023

Related U.S. Application Data (63) Continuation of application No. PCT/US2020/042679, filed on Jul. 17, 2020.

(Continued)

(51) Int. Cl.
| | |
|---|---|
| *G06F 11/14* | (2006.01) |
| *G06F 11/18* | (2006.01) |
| *G06F 11/20* | (2006.01) |

(52) U.S. Cl.
CPC ........ *G06F 11/1458* (2013.01); *G06F 11/184* (2013.01); *G06F 11/2028* (2013.01); *G06F 2201/84* (2013.01)

(58) Field of Classification Search
CPC ............... G06F 11/1458; G06F 11/184; G06F 11/2028; G06F 11/1675; G06F 11/1679; G06F 11/1683; G06F 11/1687

(Continued)

(56) References Cited

U.S. PATENT DOCUMENTS 7,287,180 B1 * 10/2007 Chen ................... H04L 41/0677
714/13
10,203,992 B2 * 2/2019 Ren .......................... G06F 9/46
(Continued)

FOREIGN PATENT DOCUMENTS

| CN | 109716302 A | * | 5/2019 | .......... G06F 11/1641 |
| CN | 109416389 B | * | 6/2021 | ......... G01R 31/3842 |

(Continued)

OTHER PUBLICATIONS

Translation of Japanese patent document JP 2004046356 A (Year: 2004).*

(Continued)

*Primary Examiner* — Chae M Ko
(74) *Attorney, Agent, or Firm* — Vierra Magen Marcus LLP (57) ABSTRACT

A fault tolerant processing environment wherein multiple processors are configured as worker nodes and redundant nodes, with a failed worker node replaced programmatically by a manager node. Each of the processing nodes may include a processor and memory associated with the processor and communicate with other processing nodes using a network. A manager node creates a message passing interface (MPI) communication group having worker nodes and redundant nodes, instructs the worker nodes to perform lockstep processing of tasks for an application, and monitors execution of the tasks. If a node fails, the manager node creates a replacement worker node from one of the redundant processing nodes and creates a new communications group. It then instructs those nodes in the new communications group to resume processing based on the application state and checkpoint backup data.

19 Claims, 10 Drawing Sheets

Related U.S. Application Data (60) Provisional application No. 63/032,604, filed on May 30, 2020.

(58) Field of Classification Search
USPC ........................................ 714/11, 12
See application file for complete search history.

(56) References Cited

U.S. PATENT DOCUMENTS

| | | | |
|---|---|---|---|
| 10,545,850 B1 * | 1/2020 | Iyer | G06F 11/302 |
| 2002/0073357 A1 * | 6/2002 | Dhong | G06F 11/1641 |
| | | | 712/E9.035 |
| 2017/0329648 A1 * | 11/2017 | Ren | H04L 69/16 |
| 2020/0034262 A1 | 1/2020 | Bemanian et al. | |

FOREIGN PATENT DOCUMENTS

| | | | | |
|---|---|---|---|---|
| JP | 2004046356 A | * | 2/2004 | |
| WO | WO-2010144913 A2 | * | 12/2010 | ........ G06F 11/1438 |

OTHER PUBLICATIONS

International Search Report and Written Opinion dated Feb. 17, 2021, International Application No. PCT/US2020/042679.

Costa, Pedro et al., "Byzantine Fault-Tolerant MapReduce: Faults Are Not Just Crashes", Cloud Computing Technology and Science, 2011 IEEE Third International Conference, Nov. 29, 2011, pp. 32-39.

Condie, Tyson et al., "MapReduce Online", Usenix, The Advanced Computing Systems Association, 2010, pp. 1-15.

International Preliminary Report on Patentability dated Dec. 15, 2022, International Application No. PCT/US2020/042679.

* cited by examiner

FIG. 12

LOCKSTEP PROCESSOR RECOVERY FOR VEHICLE APPLICATIONS

CLAIM OF PRIORITY

This application is a continuation of, and claims priority to, PCT Patent Application No. PCT/US2020/042679, entitled "LOCKSTEP PROCESSOR RECOVERY FOR VEHICLE APPLICATIONS", filed Jul. 17, 2020, which claims priority to U.S. Provisional Patent Application No. 63/032,604, entitled "PROCESSOR RECOVERY METHOD FOR THE SAFETY DESIGN OF VEHICLE CHIPS", filed May 30, 2020, which applications are incorporated by reference herein in their entirety.

FIELD

The disclosure generally relates to fault tolerant processing, and in particular, to processor recovery in multi-processor systems suitable for automated vehicle uses.

BACKGROUND

Vehicle control systems have evolved from mechanical control systems with mechanical interfaces between the driver and the vehicle to electronic control systems with associated electronic displays and interfaces. These modern systems still include a driver's operating inputs (such as throttle pedal, brake pedal, gear selector, steering wheel) whose electrical output is processed by micro-controllers that manage the powertrain, braking and steering activities via electrical actuators. Additionally, fully autonomous, self-driving vehicles are being developed that require significant and redundant processing systems for processing large data sets with a parallel, redundant processing on a set of connected distributed chipsets. A work-intensive lockstep detect/restart model may be used for such fault tolerance. There are a number of processor-based designs for fault tolerant systems involving multiple processors, including a lockstep dual processor architecture, a loosely synchronized dual-processor architecture, a dual lockstep architecture and a triple modular redundant architecture.

In typical lockstep processing platforms in large scale computing environments, a master processing element (PE) monitors the status of a number of worker PEs. Once a failure on a worker PE is detected, the master PE will reschedule the affected tasks on a different worker PE to recover the lost data. The failed worker PE is then removed from the worker group, and the total number of worker PEs is reduced by one.

BRIEF SUMMARY

According to one aspect of the present disclosure, there is provided a computing apparatus, including a plurality of processing nodes, each node including at least one processor and memory associated with the processor, each node including a communication agent. The computing apparatus also includes a network bus connecting each of the plurality of processing nodes. At least one of the plurality of processing nodes is configured as a manager node, the manager node having memory including instructions, the instructions causing the manager node to: create a communications group including a first plurality of processing nodes including worker nodes and a second plurality of processing nodes including redundant nodes; cause each of the worker processing nodes to execute a plurality of same tasks in parallel; receive outputs of the tasks performed by the worker processing nodes from the communication agents; detect a fault in one of the worker processing nodes based on the output of the tasks assigned to the one of the worker processing nodes; create a new worker node from one of the redundant processing nodes to replace the one of the worker processing nodes using the communication agent; create a new communications group including some of the first plurality of processing nodes including worker processing nodes and the new worker node; write checkpoint backup data to each of the worker nodes in the new communications group; and cause each of the worker processing nodes to execute the plurality of same tasks in parallel starting at an application state reflected in the checkpoint backup data. Other embodiments of this aspect include corresponding computer systems, apparatus, and computer programs recorded on one or more computer storage devices, each configured to perform the actions of the methods.

Implementations may include the apparatus where the computing apparatus is provided on a common substrate, where the computing apparatus is provided on a common circuit board and/or where at least one of the plurality of processing nodes is provided on a first circuit board and others of the plurality of processing nodes is provided on a second circuit board, with the circuit boards coupled by a network bus. Implementations of the embodiments of the disclosure may include a work group in which processes and a processing node correspondence table are defined. Implementations may include embodiments wherein the communication agent includes a message passing interface (MPI) agent, and wherein the communication group includes an MPI communicator group, and the manager node checks the intermediate results of the same process from each node. Implementations may include embodiments where wherein the MPI agent passes a message to a distributed computing system manager via a transmission control protocol (TCP) network, the message including a chronological order of nodes along each process, and operation characteristics to set different test points. Implementations may include embodiments further including receiving a transaction; defining a maximum computing time for each of the processing nodes within a processing time range allowed by the system; a set of test points within the allowable processing range time.

One general aspect includes a computer implemented method including: providing communication agents in a plurality of processing nodes in a computing environment, each processing nodes including a processing unit and associated memory storing instructions; creating a communications group comprising a first plurality of processing nodes comprising worker processing nodes and a second plurality of processing nodes comprising redundant processing nodes; causing each of the worker processing nodes to execute a same plurality of tasks in lockstep; receiving results of the tasks performed by the worker processing nodes from the communication agents; detecting an application fault in one of the worker processing nodes; creating a new worker node from one of the redundant nodes using the communication agent; creating a new communications group comprising a portion of the first plurality of processing nodes and the new worker node; writing checkpoint backup data to each of the worker nodes in the new communications group; and causing the worker processing nodes to execute the plurality of same tasks in parallel based on an application state reflected in the checkpoint backup data Implementations may include embodiments where the method further includes distributing the execution of the plurality of same tasks in parallel based on an application state reflected in the checkpoint backup data to balance computing load amongst the worker processing nodes in the new communications group. Implementations may include a work group, processes and physical PE correspondence table is defined. For example, the implementations may include a Hadoop cluster. Implementations may include embodiments wherein the communication agent includes a message passing interface (MPI) agent, and wherein the communication group includes an MPI communicator group, and the manager node checks the intermediate results of the same process from each node. Implementations may include embodiments wherein the MPI agent passes a message to a distributed computing system manager via a transmission control protocol (TCP) network, the message including a chronological order of nodes along each process, and operation characteristics to set different test points. Implementations may include embodiments further including receiving a transaction; generating the same tasks to perform the transaction; defining a maximum computing time for each of the processing nodes within a processing time range allowed by the system; setting a set of test points within the allowable processing range time; and distribute the tasks for execution to the worker nodes in the communication group including the new worker node.

One general aspect includes a distributed computing system including a plurality of distributed nodes each including processing circuitry and a memory associated with the processing circuitry, each of the distributed nodes including a message passing interface agent, and a network bus connecting each of the plurality of distributed nodes. At least one of the plurality of distributed nodes is configured as a manager node. The manager node has memory including instructions, the instructions causing the manager node to: create a communications group comprising a first plurality of processing nodes comprising worker processing nodes and a second plurality of processing nodes comprising redundant processing nodes; cause each of the worker processing nodes to execute a plurality of same tasks for an application in lockstep with each other worker processing nodes; receive outputs of the tasks performed by the worker processing nodes from the message passing interface agents; detect a fault in one of the worker processing nodes based on the output of the tasks assigned to the one of the worker processing nodes; remove the one of the worker processing nodes exhibiting the fault from the communications group; create a new worker node from one of the redundant processing nodes to replace the one of the worker processing nodes using the message passing interface agent; create a new communications group comprising the first plurality of processing nodes remaining in the communications group and the new worker node; write checkpoint backup data to each of the worker nodes in the new communications group; and cause each of the worker processing nodes to execute the plurality of same tasks in parallel starting at an application state reflected in the checkpoint backup data.

Implementations may include embodiment where the distributed computing system is provided on a common substrate, where the computing apparatus is provided on a common circuit board and/or where at least one of the plurality of processing nodes is provided on a first circuit board and others of the plurality of processing nodes is provided on a second circuit board, with the circuit boards coupled by a network bus. Implementations may include embodiments wherein a work group, processes and processing node correspondence table are defined. Implementations may include embodiment wherein the communication agent includes a message passing interface (MPI) agent, and wherein the communication group includes an MPI communicator group, and the manager node checks the intermediate results of the same process from each node. Implementations may include embodiment wherein the MPI agent passes a message to a distributed computing system manager via a transmission control protocol (TCP) network, the message including a chronological order of nodes along each process, and operation characteristics to set different test points. Implementations may include embodiments further including receiving a transaction; generating the same tasks to perform the transaction; defining a maximum computing time for each of the processing nodes within a processing time range allowed by the system; setting a set of test points within the allowable processing range time; and distribute the tasks for execution to the worker nodes in the communication group including the new worker node. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate the same or similar elements.

DETAILED DESCRIPTION

The present disclosure will now be described with reference to the figures, which in general relate to enabling lockstep processing using a processing environment having multiple processing nodes. The technology allows for a fault tolerant processing environment to be created wherein multiple processors can be configured as worker nodes and redundant nodes, with a failed worker node replaced programmatically by a manager node. Each of the processing nodes may include a processor and memory associated with the processor and communicate with other processing nodes using a network. The manager node crates a message passing interface (MPI) communication group having worker nodes and redundant nodes, instructs the worker nodes to perform lockstep processing of tasks for an application, and monitors execution of the tasks. If one of the processing nodes returns faulty results (or is otherwise determined to have faults such as communication faults), the manager node creates a replacement worker node from one of the redundant processing nodes and creates a new communications group. It then writes check-back data to the nodes in the new communication group (including the replacement worker node) and instructs those nodes in the new communications group to resume processing based on the state of the checkpoint backup data.

The technology allows for the use of fault detection based on task outputs, as well as MPI fault tolerance, to positively detect the failed node and recover provide a new worker using MPI spawn. Therefore, the Hadoop configured new processing node and connections can be recovered and managed initialized from MPI communicators. Hadoop can establish TCP connections between the processing nodes to allow them to communicate with each other, avoiding many disadvantages of the methods that using only MPI or MapReduce for fault tolerance.

The design uses storage to maintain the checkpoint backup data and copy the data to any new processing nodes when needed. It can effectively prevent the data from damage when a processing node fails. It also makes the selection of new processing nodes flexible because selection is not impacted by the location of backup data. The technology thus provides a fault tolerant distributed computing environment which recovers from processing failures.

Figure 1:
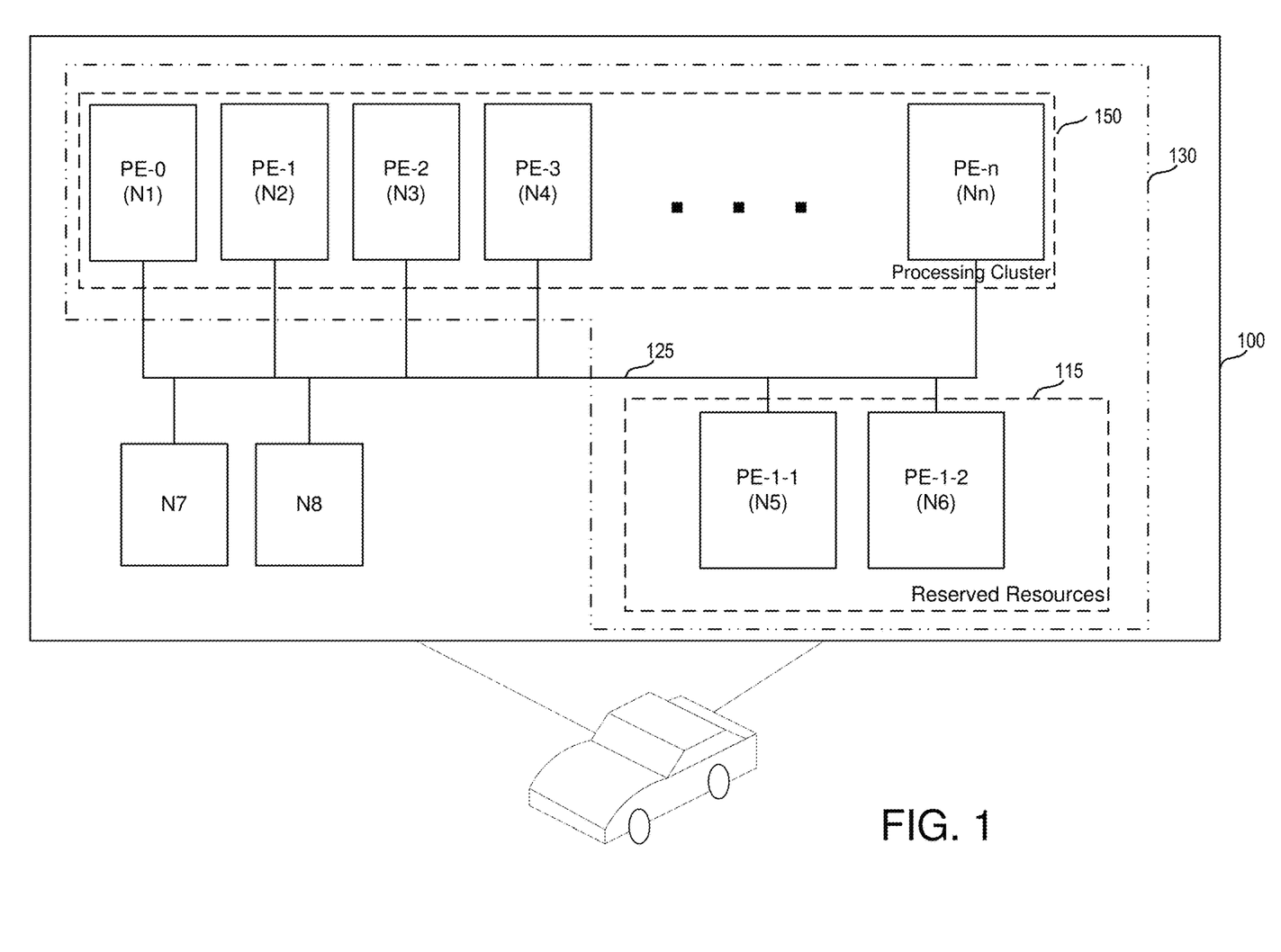
FIG. 1 is a block diagram of a computing environment suitable for implementing the present technology.

FIG. 1 is a block diagram of a distributed processing environment 100. The distributed processing environment 100 of FIG. 1 includes a plurality of processing nodes (N1-N8, ... Nn), each node having, for example, a hardware configuration illustrated in FIG. 2, although it will be understood that the technology is not limited to a particular hardware configuration for each processing node. The distributed processing environment 100 is configured and managed using message passing interface (MPI), Hadoop and MapReduce. Hadoop is software library and framework that facilitates using a network of many computers. Hadoop includes a storage component, the Hadoop Distributed File System (HDFS), and the MapReduce programming model. FIG. 1 illustrates a number of nodes N1-Nn, in the processing environment some of which may comprise processing elements (PE-0-PE-n, PE1-1, PE1-2). The MapReduce-MPI manager 190 of FIG. 1 will employ a number of nodes "C" comprising a Hadoop processing cluster 150 which are used to execute an application by executing tasks of the application. A number (R) of redundant nodes 115 may be used for backup of any worker node in case a failure happens. As illustrated in the simplified example in FIGS. 1, C=5 and R=2. The distributed processing environment 100 may also include other nodes indicated at N7-N8 which are not in the communicator group 220. Each of the nodes in the domain may be connected by a network path 125, such as a bus, network cable or other interconnection. A MapReduce program may be composed of a Map procedure (method) that performs filtering and sorting and a Reduce method that performs a summary operation. The "MapReduce System" (also called "infrastructure" or "framework") orchestrates the processing by marshalling the distributed nodes, running the various tasks in parallel (and in this technology, in lockstep), managing all communications and data transfers between the various parts of the system, and providing for redundancy and fault tolerance.

In various embodiments, the processing nodes (N1-N8, ... Nn), may be fabricated on a common semiconductor substrate and packaged accordingly. In other embodiments, the processing nodes may be coupled to a common circuit board or multiple circuit boards which are coupled by bus 125, which in such embodiment may comprise a network cable. As illustrated in FIG. 1, an advantageous application of the present technology is for use in a motor vehicle for controlling features of the motor vehicle. Given the need for safety in vehicle operations, a fault tolerant system such as that disclosed herein is useful in vehicle applications.

Figure 2:
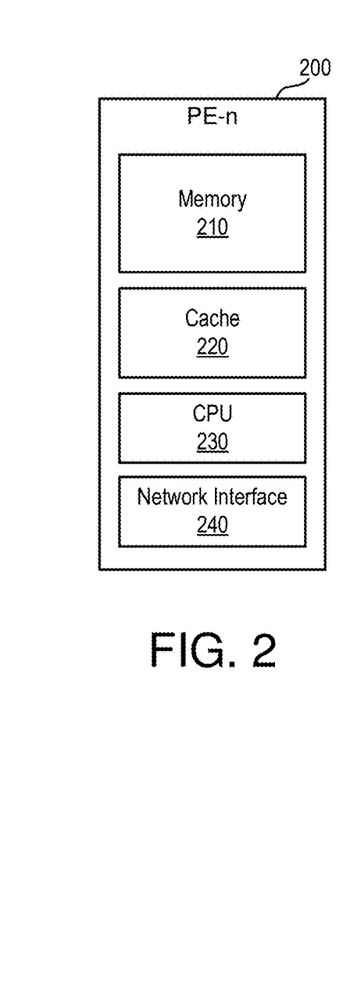
FIG. 2 is a block diagram of a processing element suitable for use in the present technology.

FIG. 2 illustrates an exemplary hardware configuration of the processing nodes illustrated in FIG. 1. A processing node configured as a processing element (PE) 200 may comprise any of the nodes used as processing elements described herein. As shown in FIG. 2, each processing element 200 may comprise a memory 210, cache 220, Central Processing Unit (CPU) 230 and network interface 240. The CPU 230 may comprise any type of electronic data processor. Memory 210 may comprise volatile memory and a non-volatile memory. The memory 210 may comprise any type of storage device configured to store data, programs, and other information and to make the data, programs, and other information accessible via the bus 125. The memory 210 may comprise any type of system memory such as static random-access memory (SRAM), dynamic random-access memory (DRAM), synchronous DRAM (SDRAM), read-only memory (ROM), a combination thereof, or the like. In an embodiment, the memory 210 may include ROM for use at boot-up, and DRAM for program and data storage for use while executing programs. Cache 220 is utilized to increase the performance of each PE by loading needed data from memory for rapid access by CPU 230. Network interface 140 couples PE 200 to the network bus 125.

In the above description, the CPU is used interchangeably with the term processor. However, a processor contains other discrete parts within it, such as one or more memory caches for instructions and data, instruction decoders, and various types of execution units for performing arithmetic or logical operations. A processor may be understood to include a multiprocessor system with more than one CPU per processing node, as well as a multicore CPU with multiple execution cores on one CPU.

The memory 210 may include computer-readable non-transitory media which stored instructions to enable the CPU to perform the methods described herein. Specific processing nodes may utilize all of the components shown, or only a subset of the components, and levels of integration may vary from device to device. Furthermore, each processing node may contain multiple instances of a component, such as multiple processing units, processors, memories, etc.

Figure 3:
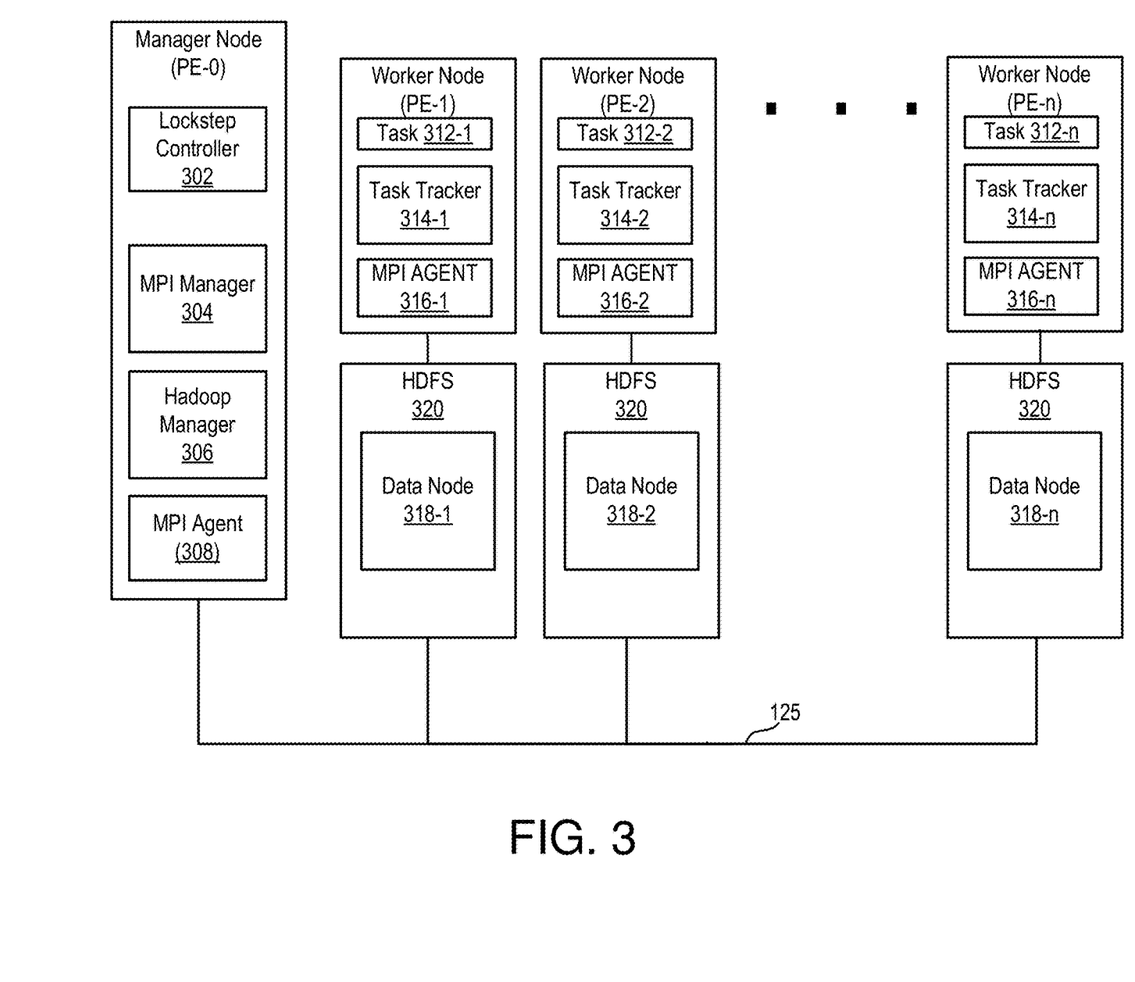
FIG. 3 is a block diagram of elements of a configured in a lockstep processing environment.

FIG. 3 illustrates some of the processing nodes of FIG. 1 configured as a processing cluster, such as cluster 150 of FIG. 1, to perform fault tolerant lockstep processing. Node PE-0 is configured a master node, while nodes PE-1, PE-2 ... PE-n represent worker nodes. In the example of FIG. 3, three (3) worker nodes are shown. It should be understood that any number of worker nodes (n) may be utilized in a processing cluster. Master node PE-0 configures the cluster, manages application tasks, and detects failures of worker nodes by monitoring the status of each worker node. Once a failure on a worker node is detected, the master node will create a replacement worker node from the pool of redundant worker nodes (such as pool 115 of FIG. 1) and reschedule the affected tasks to the replacement worker node. The failed worker node is then removed from the processing cluster, but the total number of worker nodes remains constant and processing redundancy within the cluster 150 is maintained.

MPI allows communications between all processes in a communicator at once to distribute data or perform a data reduction. As illustrated in FIG. 1, the nodes in cluster 150 as well as reserve resources 115 are part of a communicator group 130. Each node in the communicator group 130, including the redundant nodes 115, has an MPI agent. Each node in the cluster 130 is numbered and identified using the MPI agents. FIG. 3 illustrates MPI agents 316-1, 316-2, . . . 316-n in the worker nodes which communicate with each other and the master node via network bus 125. In one embodiment, a TCP/IP network may be enabled on bus 125 to allow the processing elements to communicate via TCP/IP.

Manager node PE-0 includes a lockstep controller 302, MPI manager 304, Hadoop manager 306 and its own MPI agent 308. The MPI manager 304 works with the lockstep controller 302 to execute and monitor the tasks, and the Hadoop manager 306 to define the computing cluster 130. The MPI manager 304 and controller 302 are responsible for distributing tasks to each of the PEs. The lockstep controller 302 may include a job tracker, not shown in FIG. 3, which allows the manager node to distribute and keep track of lockstep processing on each of the worker nodes PE-1, PE-2 . . . PE-n. Each worker node PE-1, PE-2 . . . PE-n includes a task tracker 314-1, 314-3, . . . 314-n tracking respective tasks 312-1, 312-3, . . . 312-n. HDFS allows for the storage of large amounts of data across multiple physical memories. HDFS achieves reliability by replicating the data across multiple nodes. MapReduce-MPI used with the HDFS duplicates data so that nodes may use local storage provided directly to a processor in a node. MapReduce takes advantage of local storage to avoid network bottlenecks when working with large data. As such, an HDFS 320 is distributed across multiple data nodes 318-1, 318-2 . . . 318-n which are associated with each worker node PE-1, PE-2 . . . PE-n. Each data node 318-1, 318-2 . . . 318-n serves up blocks of data over the network bus 125 using a block protocol specific to HDFS. The file system may utilize TCP/IP sockets for communication via a network bus 125. Each worker node and data node may use remote procedure calls (RPC) to communicate between each other.

Figure 4:
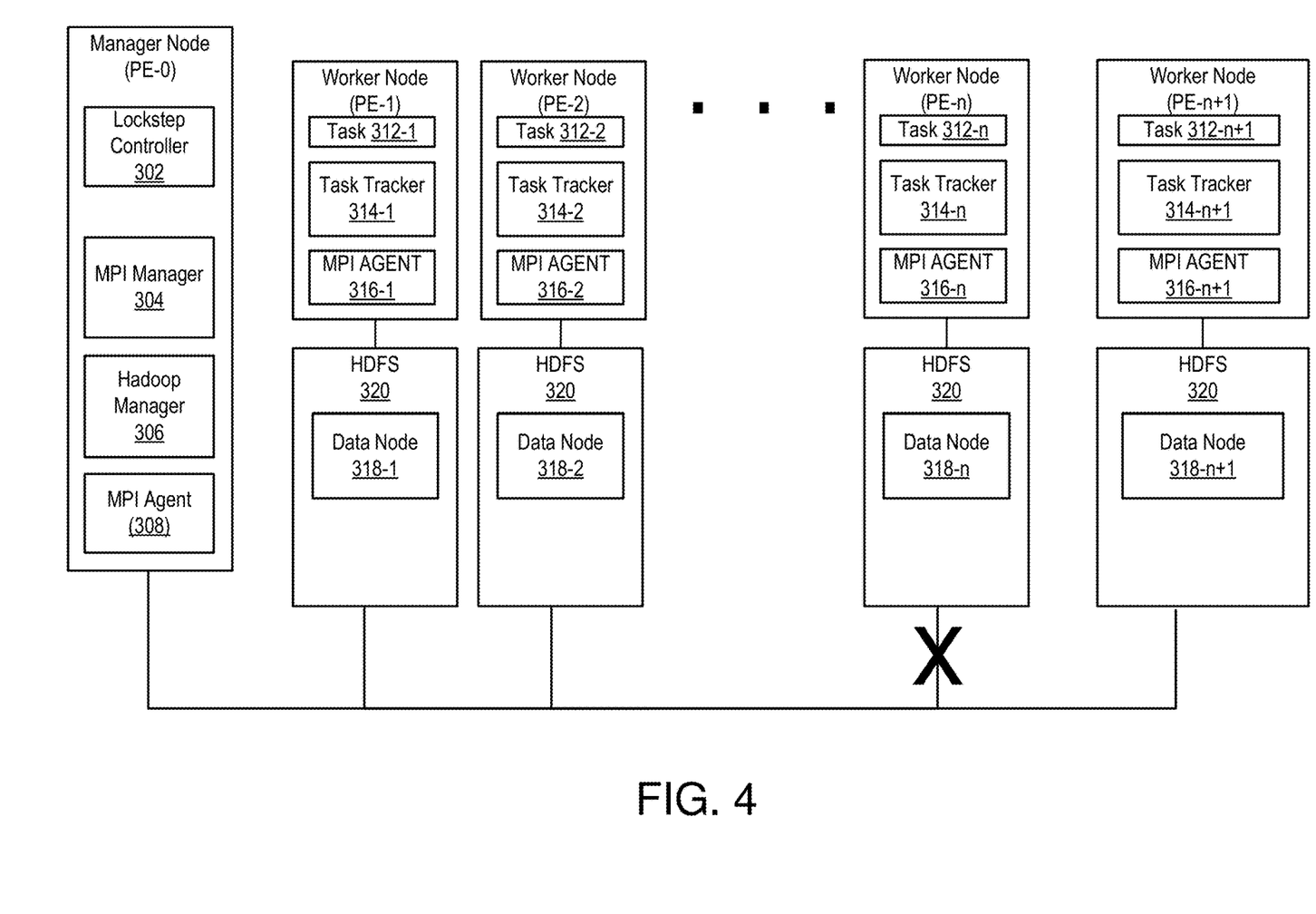
FIG. 4 illustrates replacement of a failed worker processing element with a replacement processing element.
Figure 5A:
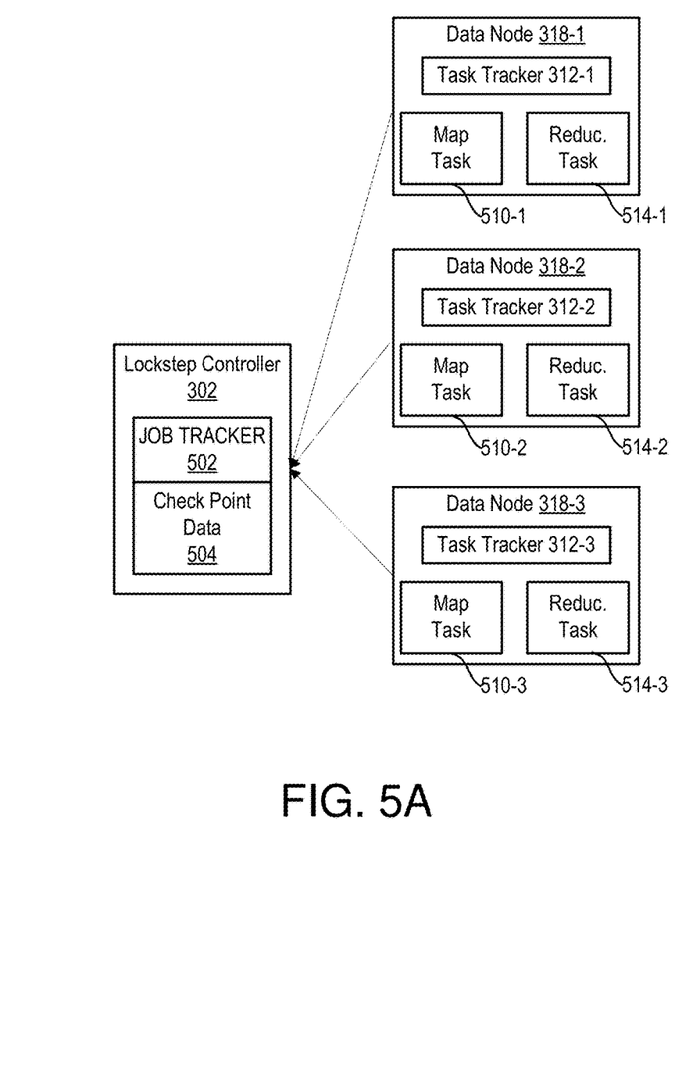
FIGS. 5A and 5B depict replacement of a worker PE from a data node and task-tracking perspective.
Figure 5B:
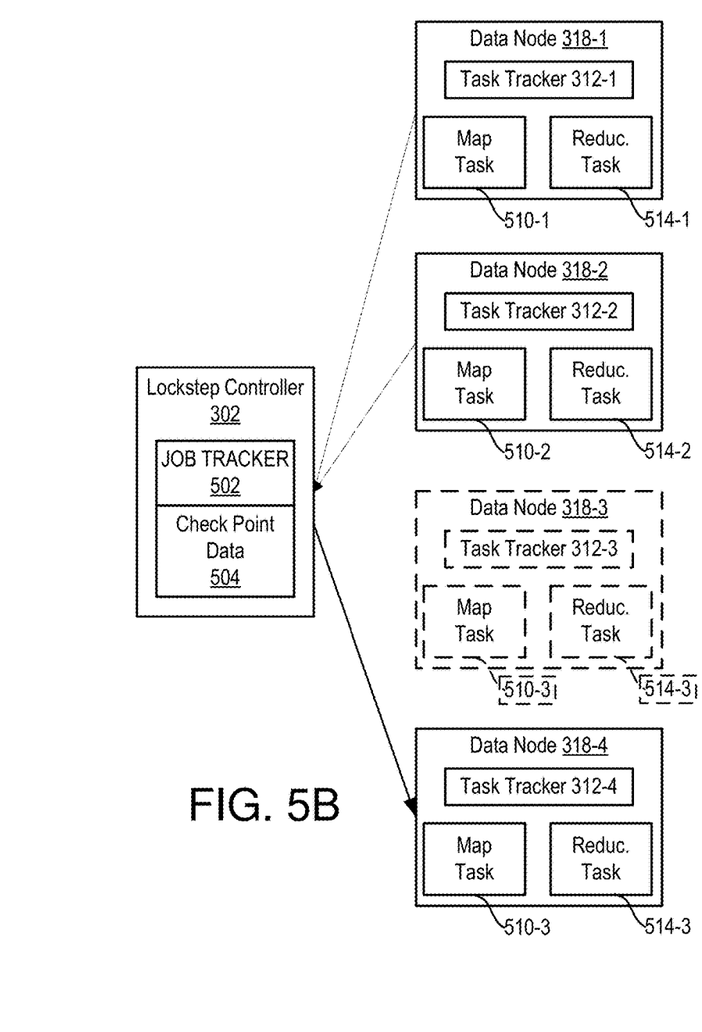

FIGS. 4 and 5A-5B illustrate the replacement of a failed PE in accordance with the present technology. In accordance with the technology, each worker node PE-1, PE-2 . . . PE-n processes tasks assigned to it by the lockstep controller. When a failure is detected in the output of a PE, in this case PEn in FIG. 4, the manager node uses MPI_Comm_Spawn to create a new worker node PE-N+1 When a worker dies, MPI_Comm_spawn replaces it, and continues processing with no fewer workers than before. The processes of a parallel worker may communicate with each other using an ordinary intercommunicator. For parallel workers, this is a simpler way to form the communicators group. Fault tolerance in this situation resides in the overall master-slave structure.

FIGS. 5A and 5B illustrate provision of data from the original data nodes comprising the HDFS file system to a data node 318-4 for a replacement worker node. As illustrated in FIG. 5A, each task tracker 312-1, 312-2, . . . 312-n provides task results to a job tracker 502 in the lockstep controller 302. The job tracker 502 thus maintains the state of each of the outputs of the processing elements of the worker nodes in the communications group. In the example of FIG. 5A, job tracker 502 receives three results and the lockstep controller determines that the results from data node 318-3 indicate a failure. As illustrated in FIG. 5B, the state of node 318-3 represented by tasks 510-3 and 514-3 are transferred by the lockstep controller to a new, replacement data node 318-4. In addition, checkpoint backup data 504 is provided to the data node 318-4. By integrating with the fault tolerant mechanisms of MPI, the method can supply new worker PEs to the system after failed PEs are removed. Therefore, the consistency of the system throughput is maintained after failure recovery. The method can also recover communications between the PEs without significantly impacting the tasks executed on the system.

Figure 6:
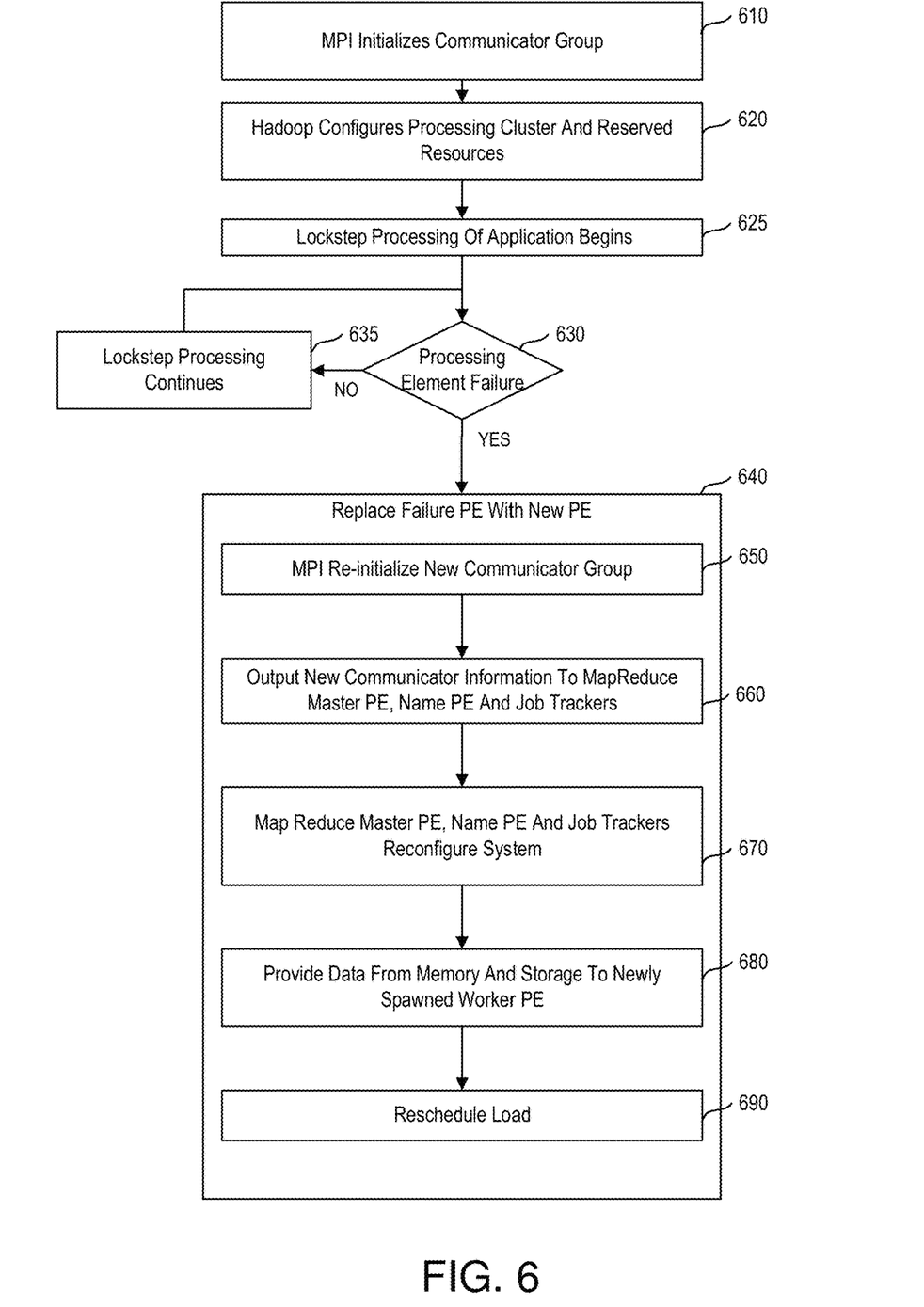
FIG. 6 is a flowchart illustrating a method in accordance with the present technology.

MPI uses checkpoints to back up the task status for fault tolerance, which takes periodic system snapshots and stores application status information in persistent storage units. If a failure occurs, the most recent status information can be retrieved and the system recovered from the checkpoints. Checkpoints are saved in a persistent storage unit that is not affected by the failure of a single computing element. In FIG. 5B, the MPI checkpointing mechanism forms the checkpoints on the master node PE-0 as check point data 504 and writes the data needed to restart the application. The load can then be rescheduled for processing amongst the same number of processing elements (three in this example) as existed prior to the failure of the worker processing element FIG. 6 is a flowchart illustrating a method in accordance with the technology for fault tolerant lockstep processing. At 610, MPI initializes a communicator group. In one embodiment, the manager processing element uses MPI to initialize the communicator group with MPI_COMM_WORLD. A communicator group represents a processing environment in an ordered set of processing environments initialized by MPI. The manager PE collects information from all communicators (MPI agents) from the distributed system. At 620, Hadoop configures processing cluster 130 and reserved resources 115. Hadoop initialization may comprise providing the named PE, and job trackers to each of the processing nodes in MPI_Comm_World. At 625, lockstep processing of an application begins by the lockstep controller 302 distributing tasks to each of the worker node processing elements in the processing cluster 150 in parallel. This includes sending the node numbers, node names and the HDFS data path in which the application will run along with application file names and instructions. At 630, the method checks to determine whether or not a processing element failure has occurred by checking the task ouput data is returned to the lockstep manager 302. Additional details on checking for failures is discussed below with respect to FIG. 8. If no failure is detected at 630, the lockstep processing continues with all worker node PEs in the cluster contributing their results. If a worker node PE failure is detected at 630, then the system moves to replace the failed PE with the new PE at 640. Step 640 may be broken down into sub steps 650, 660, 670, 680, and 690.

At 650, a new communicator group is initialized using MPI_Comm_Spawn which provides New_MPI_COMM_WORLD with the same size as the original MPI_COMM_

WORLD. At step 660, the lockstep manager outputs a new communicator information to the map reduce master PE (PE-0 in the previous FIGS.), name processing element and job trackers. This includes providing individual threads and processes of each thread to reflect the PE state in the new worker PE. At 670, the manager node PE-0 (the map reduce master processing element, name processing element and job trackers) reconfigure the processing environment by providing state information to the new worker node. At 680, data from memory and storage is provided to the newly spawned worker processing element.

Figure 7:
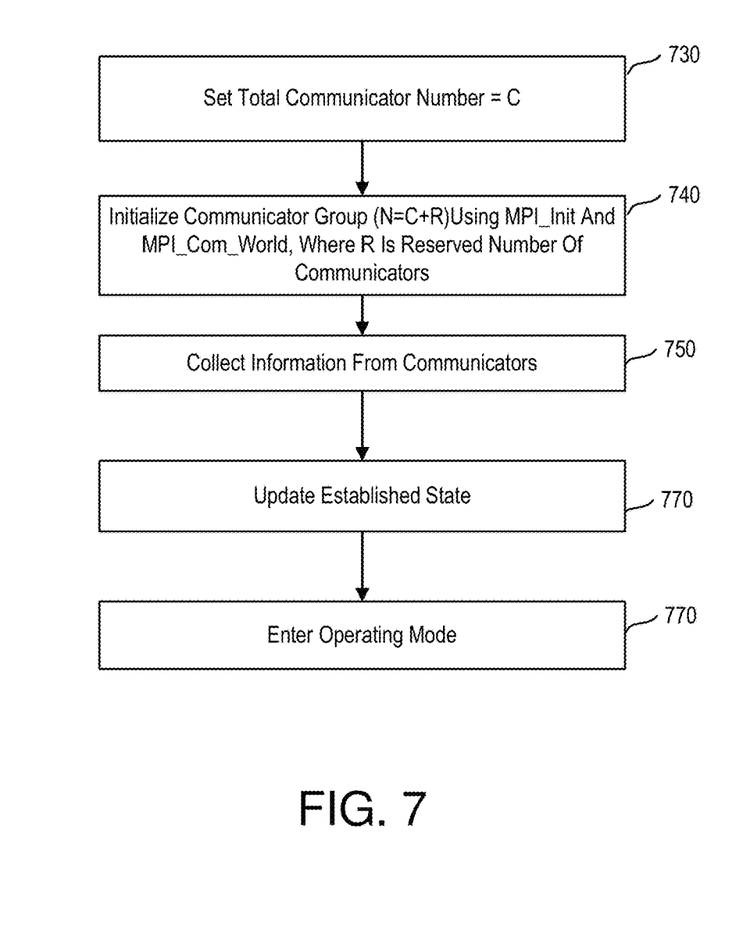
FIG. 7 is a flowchart illustrating a step of establishing a communicator group.

FIG. 7 is a flowchart illustrating a communicator group initialization procedure. At 730, the total communicator number=C is set at master node PE-0. At 740, the communicator group is initialized with n=C+R communicators using MPI_INIT and MPI_COMM_WORLD, where R is the reserved number of communicators. Information from all communicators is collected at 750 and an established state is updated after all the information is collected at 760. At 770, a normal operating mode is entered allowing each node to communicate via MPI.

Two forms of errors may be detected at step 430—application errors and native MPI error detection.

Figure 8:
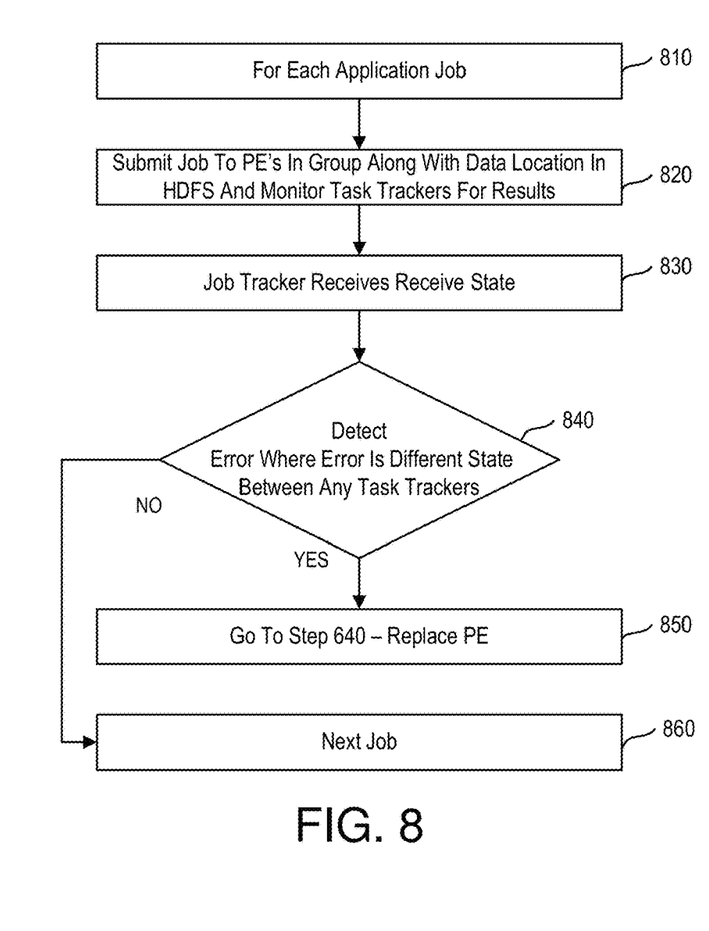
FIG. 8 is a flowchart illustrating detection of an error in a worker processing environment.

FIG. 8 illustrates a method whereby an application result is determined to be in error which may indicate a failure in a processing node. For each application job at 810, the job tracker 802 submits the job to all PEs in the communication group 130 along the data location in HDFS. As the Pes perform the job, the job tracker 802 receives the PEs job results at 830. At 840, a determination is made as to whether there is an error in the results between different PEs. There may be any number of reasons for a disparity in the results of a PE. Transient faults may be due to electrical noise or external radiations. Radiation can, directly or indirectly, induce localized ionization events capable of upsetting internal data states. While a physical instance may cause a data error, it is possible the computing circuit itself is undamaged and the system experiences a transient fault. However, multiple faults can indicate a failed processing node and hence a permanent fault in the system. To determine whether one of the PEs in the cluster has an error, one may utilize majority voting—the results of the majority of each of the PEs in the cluster are taken as valid. If no error is present at 840, the method moves to the next task at 860. If a failed PE is detected at 840, then at 850, a replacement PE process begins as described at 640 above.

A second type of failure may be detected by MPI. MPI has a highly accurate and complete failure detector. An application may be notified of a process failure when it attempts to communicate directly or indirectly with the failed process through the return code of the function and the error handler set on the associated communicator. The designed MPI mechanism realizes a recover-and-continue solution that re-spawns only failed processes if an error occurs while keeping living processes within their original processors or nodes.

To minimize the impact of the failure recovery process to the system, in one embodiment, a component, such as an MPI error handler, periodically checks the status of the MPI communicators. If a communicator failure is detected, the MPI will try to re-connect.

Figure 9:
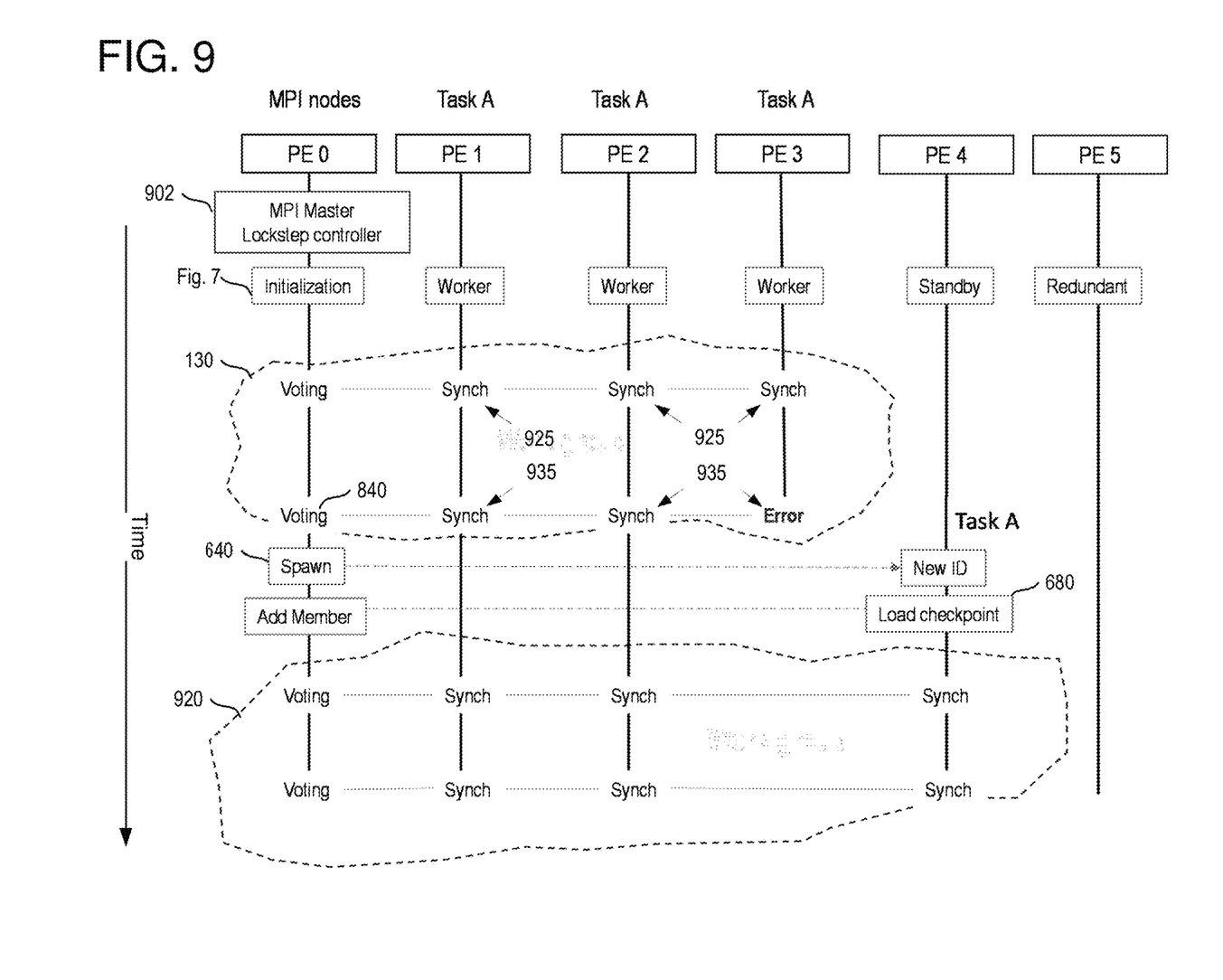
FIG. 9 is a depiction of a method for detecting errors in a lockstep processor system in accordance with the technology.

FIG. 9 illustrates the method by which the intermediate results of the same processes on different nodes are checked. By comparing the intermediate results of each worker node for a given task (TASK A, in this example), one can determine whether each task or process has an error on one of the worker nodes. Illustrated in FIG. 9 are three worker nodes PE-1, PE-2 and PE-3, and one master node PE-0 along with two redundant nodes PE4 and PE5. For each task, the MPI master node sets different test points along the time sequence of each process or may set different test points based on MPI's calculation of the task's output characteristics. At each test point, for example point 925, each processing environment submits its own intermediate data (Synch) to the MASTER PE (PE-0) in the communication group 130. The MASTER PE receives the job results of each PE and determines whether the results between different PEs are wrong by a vote. At point 925, all test results are the same. The MPI Master Lockstep controller 902 may include components such as ab MPI error processor and MPE communicator, with the MPI error processor regularly checking the calculation results of the MPI communicator. If an abnormal calculation result is detected, such as a minority in the vote, as indicated from PE-3 at time 935, the MPI Master Lockstep Controller 902 may continue to monitor additional test points or, as indicated in FIG. 9, may begin the process or replacing PE-3. If this error occurs repeatedly on the same node, MPI will use this node as the error node, shut down the node, and find a new node (PE-4 in this example) to replace it. The present technology thus uses the MPI mechanism to implement a PE recovery and continue solution that regenerates the failed process only when an error occurs, while keeping the active process in its original processor or node.

Figure 10:
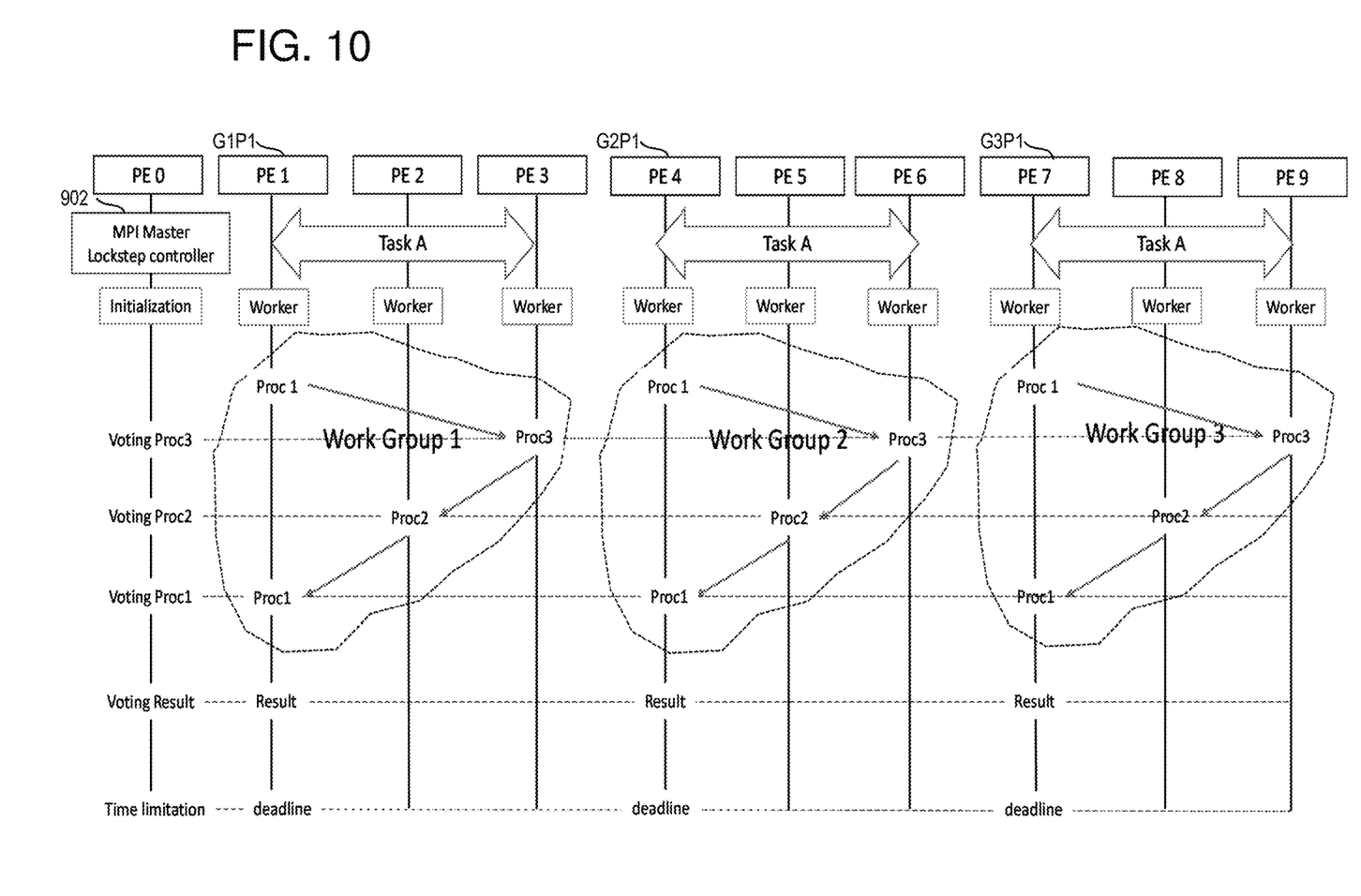
FIG. 10 is a depiction of multiple lockstep processor systems operating in parallel.

FIG. 10 illustrates a variation of the present technology whereby 10 nodes are split into three different work groups, all performing parallel computing on the same task (TASK A). Again, the MPI master node sets different test points along the time sequence of each process. The 10 nodes (PE-0-PE-9) are divided into three work groups for distributed processing of a task. As each work group performs distributed computing, the MPI master node 902 will distinguish whether each PE in each group runs the same work. G1P1 and G2P1 represent PE1 of Group1 and PE1 of Group2, respectively. These two PEs are in different groups but have the same role in parallel computing. The calculations of these two nodes should be consistent, and their results can be compared.

Therefore, the present technology utilizes a process and character comparison table in main PE-0. The structure of the table is as follows:

| MPI workgroup (G) | 1 | 1 | 1 | 2 | 2 | 2 | 3 | 3 | 3 |
|---|---|---|---|---|---|---|---|---|---|
| Logical PE number | 1 | 2 | 3 | 1 | 2 | 3 | 1 | 2 | 3 |
| Physical PE number (PE-n) | 1 | 2 | 3 | 4 | 5 | 6 | 7 | 8 | 9 |

In this table, G1P1 and G2P1 correspond to physical devices PE1 and PE4. Similarly, G3P1 corresponds to physical device PE7. By comparing their intermediate results on a given task, one can determine whether each process has an error. As in FIG. 9, for each application job (TASK A) at 10 locations, the MPI master node sets different test points (Proc 1, Proc3, Proc3) along the time sequence of each process, or may set different test points based on MPI's calculation of task output characteristics.

In the example of FIG. 10, each process submits its own intermediate data to the MASTER PE in the communication group 130. When performing a job, MPIMASTER PE receives the job results of each PE and determines whether the results between different PEs are wrong by vote. Components such as the MPI error processor regularly check the calculation results of the MPI communicator. If an abnormal calculation result is detected, such as a minority in the vote, MPI will continue to monitor. If this error occurs repeatedly on the same node, MPI will use this node as the error node, shut down the node, and find a new node to replace it.

Figure 11:
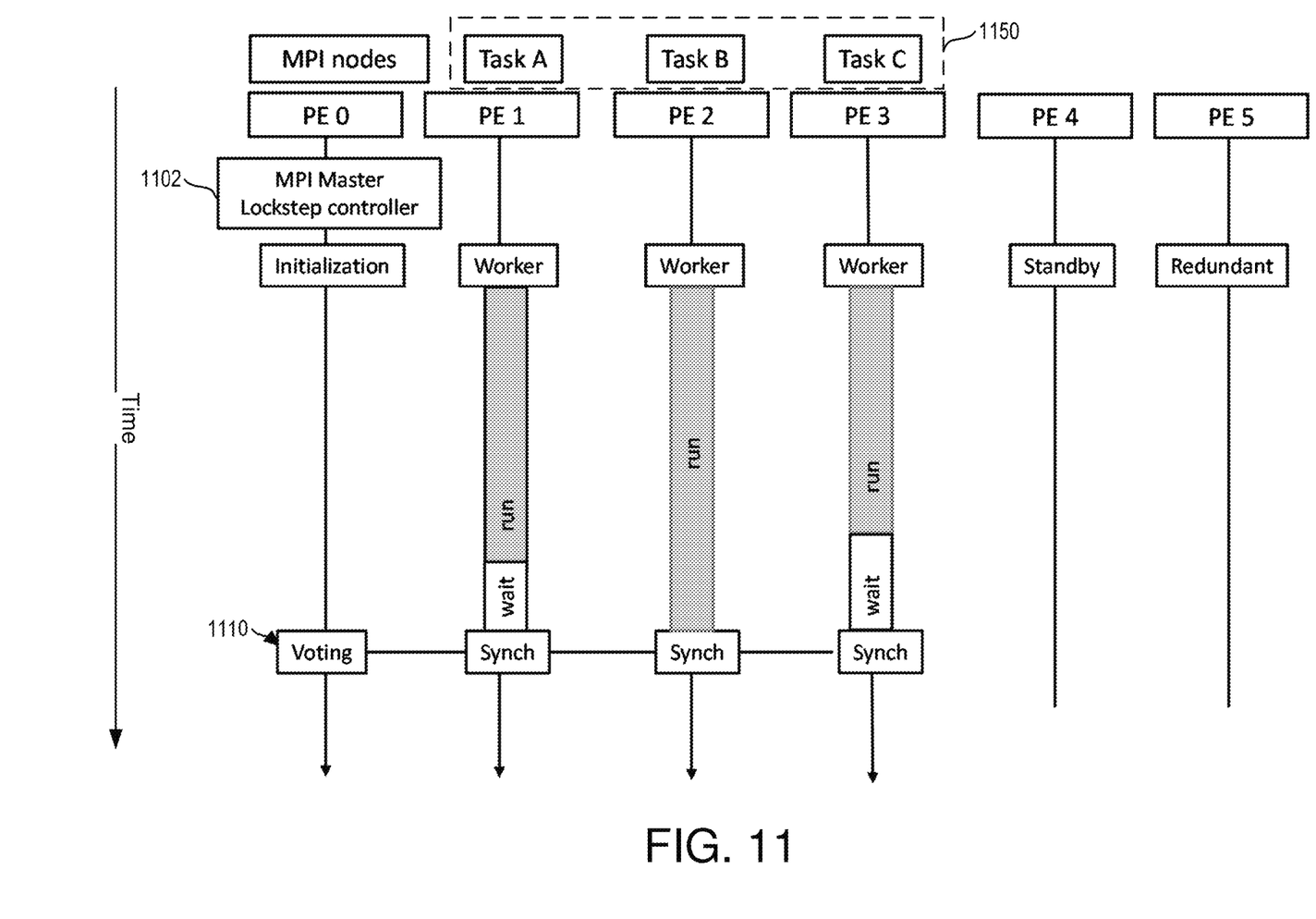
FIG. 11 is a depiction of multiple lockstep processor systems operating in parallel using different algorithms.

FIG. 11 shows a scenario wherein each different processing elements use different algorithms to solve a problem. For example, different AI algorithms may be used to identify an object and their results will be sent to a lockstep controller 1102 for a majority vote on the algorithm results from each PE. Since different algorithms performed on each different PE, the calculation methodologies adopted by each PE are different, and as such, their intermediate results are not comparable. Lockstep controller 1102 can only compare each PE's final output after the task is completed. On the other hand, different PEs should complete their work within a time frame defined by the system as a whole. For example, in a self-driving automotive application, the time consumption of each PE to identify an object should be short enough to allow control systems in the vehicle to react to the object if needed. The MPI master lockstep controller PE-0 1102 sets a test point, such as at time 1110, along the time sequence of each process. The time of the test point should before the reaction time minimum for a car in the above scenario, but long enough to complete majority voting of the results.

For a response time is defined as T, which is determined by the vehicle speed, road conditions and the driver, and/or configuration by the driver, and a slowest vote processing time is defined as V, which is determined according to the empirical value of the actual system, the maximum algorithm processing time T(comp) should satisfy T(comp)<T-V. If the algorithm processing time T(comp) is reached but a PE cannot send the results to lockstep controller 1102, the lockstep controller 1102 judges that the PE is failed, and removes it from the current vote. The lockstep controller 1102 receives the job results of other PEs and determines whether the results between different PEs are wrong by vote. The final result output is the vote of all PEs.

Figure 12:
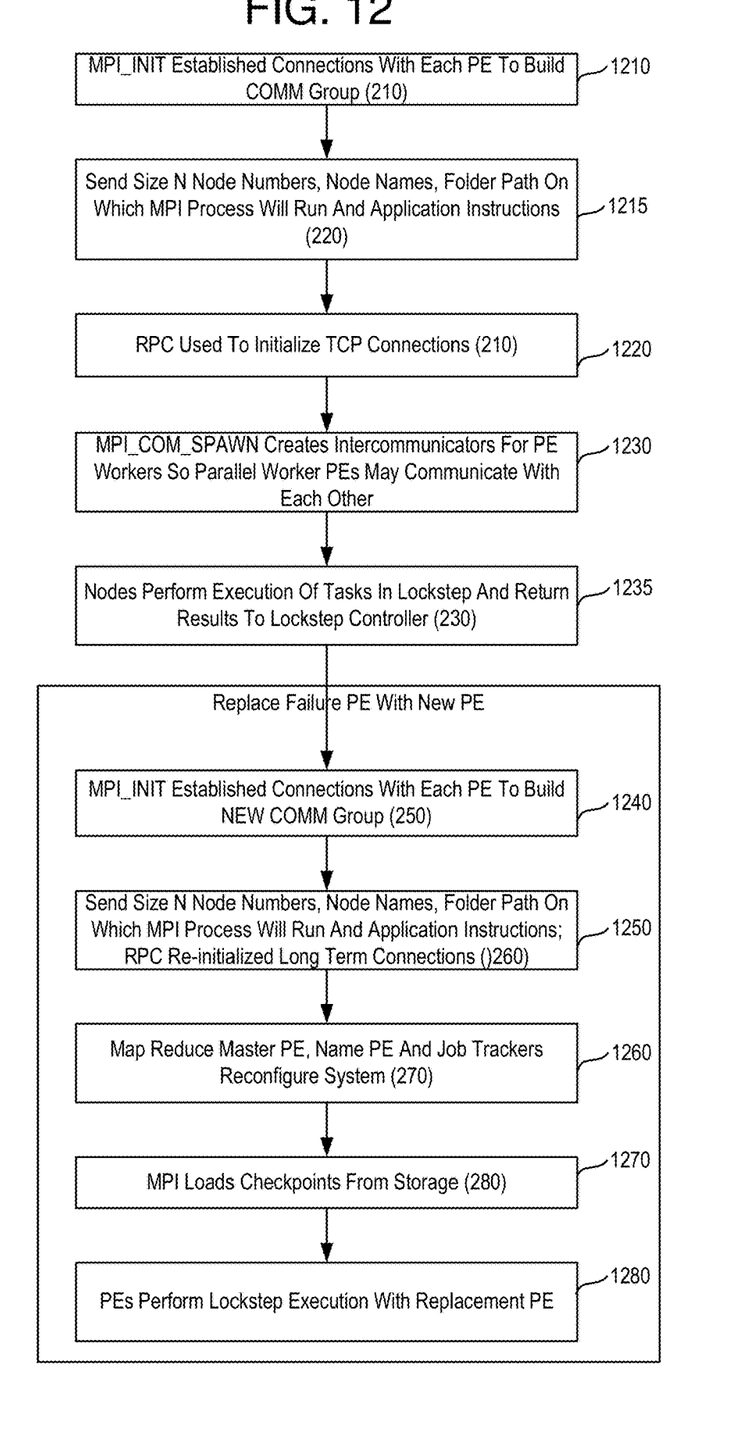
FIG. 12 is a flowchart illustrating one embodiment for performing the method illustrated of FIG. 6.

FIG. 12 is a flowchart illustrating a specific version of the method illustrated in FIG. 6. At 1210, manager processing element uses MPI to initialize the communicator group with MPI_COMM_WORLD. It establishes connections with each PE, building a communication group that includes all communicators, and ensures that they are up and available.

At 1220, the manager node sends the node numbers, names, and folder path in HDFS where the MPI process will run, along with application instructions. At 1220, a remote procedure call (RPC) is used to initialize the independent, TCP connections with each PE. At 1230 MPI_Comm_Spawn is used to create communicators. For parallel workers, this is a simpler way to form the communicator group. When a worker dies, MPI_Comm_spawn replaces it, and continues processing with no fewer workers than before. At 1235, each node performs execution of application tasks in lockstep and returns the results to the lockstep controller. Each node can deploy multiple threads. A node is assumed to be failed if the status is down. MPI implementation returns an error code if a communication failure occurs such as an aborted process or failed network link.

At 1240, MPI Init establishes connection with each PE to build a new communicator group NEW_MPI COMM_ WORKLD. At 1250, sends size N node numbers, node names, a folder path on which the MPI process will run, and the file names with application instructions.

At 1260, the map reduce Master Node, name PE and Job trackers reconfigure the communicator group. At 1270, the MPI process 1200 sends size n node numbers, node names, the folder path on which the MPI process will run, and the file names with application instructions. RPC re-initializes independent, long-term TCP connections.

At 1270, check point data is loaded from storage. At 1280, MPI loads the checkpoints from storage, and at 1280, the Hadoop nodes perform parallel execution independent of MPI applications.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

What is claimed is:

1. A computing apparatus, comprising:
a plurality of processing nodes, each node comprising at least one processor and memory associated with the processor, each node including a communication agent;
a network bus connecting each of the plurality of processing nodes; and
at least one of the plurality of processing nodes configured as a manager node, the manager node having memory including instructions, the instructions causing the manager node to:
create a communications group comprising a first plurality of processing nodes comprising worker processing nodes and a second plurality of processing nodes comprising redundant processing nodes;
instruct each of the worker processing nodes to execute a plurality of same tasks in parallel;
receive, at intervals specified by the manager node, intermediate processing results of each of the plurality of same tasks performed by the worker processing nodes from each of the communication agents associated with a worker processing node;
detect a fault in one of the worker processing nodes based on the results of the tasks performed by the one of the worker processing nodes by checking the one or more intermediate processing results of each of the plurality of same tasks performed by the worker processing nodes;
create a new worker processing node from one of the redundant processing nodes to replace the one of the worker processing nodes with the fault using the communication agent;
create a new communications group comprising some of the first plurality of processing nodes comprising worker processing nodes and the new worker processing node;
write checkpoint backup data to each of the worker processing nodes in the new communications group; and
cause each of the worker processing nodes to execute the plurality of same tasks in parallel starting at an application state reflected in the checkpoint backup data.

2. The apparatus of claim 1 wherein the computing apparatus is provided on a common substrate.

3. The apparatus of claim 1 wherein the computing apparatus is provided on a common circuit board.

4. The apparatus of claim 1 wherein at least one of the plurality of processing nodes is provided on a first circuit board and others of the plurality of processing nodes is provided on a second circuit board, with the circuit boards coupled by a network bus.

5. The apparatus of claim 1 wherein a work group, processes and processing node correspondence table are defined.

6. The apparatus of claim 1 wherein a message passing interface (MPI) agent passes a message to a distributed computing system manager via a transmission control protocol (TCP) connections, the message including the intermediate results along a time sequence of each process.

7. The apparatus of claim 1 where the instructions causing the manager node to:
receive a transaction;
generate the plurality of same tasks to perform the transaction;
define a maximum computing time for each of the processing nodes within a processing time range allowed by the computing apparatus;
set different test points within an allowable processing range time; and
distribute the plurality of same tasks for execution to the worker processing nodes in a communications group including the new worker processing node.

8. A computer implemented method comprising:
providing communication agents in a plurality of processing nodes in a computing environment, each processing nodes including a processing unit and associated memory storing instructions;
creating a communications group comprising a first plurality of processing nodes comprising worker processing nodes and a second plurality of processing nodes comprising redundant processing nodes;
instructing each of the worker processing nodes to execute a plurality of same tasks in parallel;
receiving, at intervals specified by a master processing node, intermediate processing results of the plurality of same tasks performed by the worker processing nodes from each of the communication agents associated with a worker processing node;
detecting an application fault in one of the worker processing nodes by checking one or more intermediate results of each of the plurality of same tasks performed by the worker processing nodes;
creating a new worker processing node from one of the redundant processing nodes to replace the one of the worker nodes with the fault using at least one of the communication agents;
creating a new communications group comprising a portion of the first plurality of processing nodes and the new worker processing node;
writing checkpoint backup data to each of the worker processing nodes in the new communications group; and
causing the worker processing nodes to execute the plurality of same tasks in parallel based on an application state reflected in the checkpoint backup data.

9. The method of claim 8 further including distributing execution of the plurality of same tasks in parallel based on an application state reflected in the checkpoint backup data to balance computing load amongst the worker processing nodes in the new communications group.

10. The method of claim 8 wherein a work group, processes and physical processing element correspondence table is defined.

11. The method of claim 8 wherein each of the communication agents includes a message passing interface (MPI) agent, and wherein the communications group includes an MPI communicator group, and a manager node checks intermediate results of a same process from each node.

12. The method of claim 11 wherein the MPI agent passes a message to a distributed computing system manager via a transmission control protocol (TCP) network, the message including the intermediate results along a time sequence of each process.

13. The method of claim 8, further comprising receiving a transaction;
generating the plurality of same tasks to perform the transaction;
defining a maximum computing time for each of the processing nodes within a processing time range allowed;
setting different test points within an allowable processing range time; and
distributing the plurality of same tasks for execution to the worker processing nodes in a communications group including the new worker processing node.

14. A distributed computing system in a motor vehicle, comprising:
a plurality of distributed nodes each comprising processing circuitry and a memory associated with the processing circuitry, each of the distributed nodes including a message passing interface (MPI) agent; and
a network bus connecting each of the plurality of distributed nodes, at least one of the plurality of distributed nodes configured as a manager node, the manager node having memory including instructions, the instructions causing the manager node to:
create a communications group comprising a first plurality of processing nodes comprising worker processing nodes and a second plurality of processing nodes comprising redundant processing nodes;

instruct each of the worker processing nodes to execute a plurality of same tasks for an application in lockstep with each other worker processing nodes;

receive, at intervals specified by a master processing node, intermediate processing results of the plurality of same tasks performed by the worker processing nodes from each of the message passing interface agents associated with a worker processing node;

detect a fault in one of the worker processing nodes based on the results of the plurality of same tasks performed by the one of the worker processing nodes by checking the one or more intermediate processing results of each of the plurality of same tasks performed by the worker processing nodes;

remove the one of the worker processing nodes exhibiting the fault from the communications group;

create a new worker processing node from one of the redundant processing nodes to replace the one of the worker processing nodes exhibiting the fault using the message passing interface agent;

create a new communications group comprising the first plurality of processing nodes remaining in the communications group and the new worker processing node;

write checkpoint backup data to each of the worker processing nodes in the new communications group; and cause each of the worker processing nodes to execute the plurality of same tasks in parallel starting at an application state reflected in the checkpoint backup data.

15. The distributed computing system of claim 14 wherein at least one of the plurality of processing nodes is provided on a first circuit board and others of the plurality of processing nodes is provided on a second circuit board, with the circuit boards coupled by a network bus.

16. The distributed computing system of claim 14 wherein a work group, processes and processing node correspondence table are defined.

17. The distributed computing system of claim 14 wherein the communications group includes an MPI agent group, and the manager node checks the intermediate results of the same process from each worker processing node.

18. The distributed computing system of claim 17 wherein the MPI agent passes a message to a distributed computing system manager via a transmission control protocol (TCP) network, the message including the intermediate results a time sequence of each process.

19. The distributed computing system of claim 14 wherein the instructions causing the manager node to further:

receive a transaction;

generate the plurality of same tasks to perform the transaction;

define a maximum computing time for each of the processing nodes within a processing time range allowed by the computing system;

set different test points within an allowable processing range time; and distribute the plurality of same tasks for execution to the worker processing nodes in the new communications group including the new worker processing node.

* * * * *